United States Patent
Pan

(10) Patent No.: US 11,785,189 B2
(45) Date of Patent: Oct. 10, 2023

(54) ILLUMINATION SYSTEM, PROJECTION APPARATUS, AND LIGHT UNIFORMIZING ELEMENT

(71) Applicant: Coretronic Corporation, Hsin-Chu (TW)

(72) Inventor: Haw-Woei Pan, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 130 days.

(21) Appl. No.: 17/548,567

(22) Filed: Dec. 12, 2021

(65) Prior Publication Data

US 2022/0210384 A1    Jun. 30, 2022

(30) Foreign Application Priority Data

Dec. 30, 2020   (CN) .......................... 202023259022.X

(51) Int. Cl.
*H04N 9/31*        (2006.01)
*F21V 8/00*        (2006.01)

(52) U.S. Cl.
CPC ......... *H04N 9/3152* (2013.01); *G02B 6/0011* (2013.01); *H04N 9/3161* (2013.01)

(58) Field of Classification Search
CPC ... H04N 9/3152; H04N 9/3161; G02B 6/0011
See application file for complete search history.

(56) References Cited

U.S. PATENT DOCUMENTS

| 9,645,480 | B2 | 5/2017 | Liao et al. |
| 10,444,611 | B2 | 10/2019 | Pan et al. |
| 2015/0263486 | A1* | 9/2015 | Terasaki ............... G03B 21/145 353/30 |
| 2018/0284450 | A1* | 10/2018 | Pan ..................... G02B 27/0176 |
| 2021/0278668 | A1* | 9/2021 | Shih ................... G02B 27/0172 |
| 2022/0337793 | A1* | 10/2022 | Liu ...................... H04N 9/3194 |

FOREIGN PATENT DOCUMENTS

CN               2731487           10/2005

* cited by examiner

*Primary Examiner* — Mary Ellen Bowman
(74) *Attorney, Agent, or Firm* — JCIPRNET

(57) ABSTRACT

An illumination system, including a light source module and a light uniformizing element, is provided. The light source module provides an illumination light beam. The light uniformizing element has a light incident surface and a light exit surface opposite to the light incident surface, and includes at least one light splitting surface. The light splitting surface is located inside the light uniformizing element. A normal vector of the light splitting surface is perpendicular to a central axis of the light uniformizing element. The illumination light beam is incident to the light incident surface of the light uniformizing element at an oblique angle, and the illumination light beam is split multiple times by the light splitting surface, so that the light uniformizing element outputs a uniformized illumination light beam at the light exit surface. A projection device and a light uniformizing element are also provided.

21 Claims, 14 Drawing Sheets

ILLUMINATION SYSTEM, PROJECTION APPARATUS, AND LIGHT UNIFORMIZING ELEMENT

CROSS-REFERENCE TO RELATED APPLICATION

This application claims the priority benefit of China application serial no. 202023259022.X, filed on Dec. 30, 2020. The entirety of the above-mentioned patent application is hereby incorporated by reference herein and made a part of this specification.

BACKGROUND

Technical Field

The invention relates to an optical system, an optical apparatus and an optical element, and particularly relates to an illumination system, a projection apparatus, and a light uniformizing element.

Description of Related Art

Projection apparatus has been continuously improved along with evolution and innovation of science and technology. A light source used in the projection apparatus is mainly a laser diode light source. At present, a main method is to use a blue light source to excite phosphor on a phosphor color wheel to generate yellow green light, and then filter out required red or green light by using a filter color wheel, and in collaboration with blue light generated by a blue laser diode, the three primary colors of red, green and blue (RGB) required for constructing a projection image are formed.

In a blue light path of an optical framework of a projection apparatus, after the blue light is emitted from a laser diode, the blue light passes through optical elements and is incident to a reflective region of the phosphor color wheel at an oblique angle. The blue light that is reflected by the reflective region to exit obliquely is finally incident to a light uniformizing element obliquely through optical elements (such as a light splitting element that reflects the blue light and a lens). However, when the blue light is incident to the light uniformizing element in an "asymmetrical" manner, it causes poor color uniformity of the projection image. Therefore, in the optical path, the light splitting element that reflects the blue light is generally modified to 50% reflection and 50% penetration, and a piece of reflective element is added so that the blue light may be incident to the light uniformizing element symmetrically. However, the additional added reflective element increases the number of optical elements and mechanism fixing parts, resulting in an increase of cost.

In a blue light path of an optical framework of another projection apparatus, in order to make the blue light enter the light uniformizing element symmetrically, a light splitting element that reflects 50% of the blue light and transmits 50% of the blue light is added between two sets of lenses. However, by additionally add the light splitting element, besides that the optical elements and mechanical fixing parts are increased to cause the increase of cost, the yellow green light passes through an extra optical element in the optical path, which results in a brightness loss of 0.5% to 1.0%.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a light uniformizing element, where blue light is unnecessary to enter symmetrically, and light angle distribution of a light beam emitted from the light uniformizing element is more uniform.

The invention is directed to an illumination system and a projection apparatus using the aforementioned light uniformizing element, which make a light path more concise and improve efficiency of light energy use, and at the same time reduce the cost.

An embodiment of the invention provides an illumination system including a light source module and a light uniformizing element. The light source module is configured to provide an illumination light beam. The light uniformizing element has a light incident surface and a light exit surface opposite to the light incident surface, and the light uniformizing element includes at least one light splitting surface. The light splitting surface is located inside the light uniformizing element. A normal vector of the light splitting surface is perpendicular to a central axis of the light uniformizing element. The illumination light beam is incident to the light incident surface of the light uniformizing element at an oblique angle, and the illumination light beam is split multiple times by the light splitting surface, so that the light uniformizing element outputs a uniformized illumination light beam at the light exit surface.

An embodiment of the invention provides a projection apparatus including an illumination system, a light valve, and a projection lens. The illumination system includes a light source module and a light uniformizing element. The light source module is configured to provide an illumination light beam. The light uniformizing element has a light incident surface and a light exit surface opposite to the light incident surface, and the light uniformizing element includes at least one light splitting surface. The light splitting surface is located inside the light uniformizing element. A normal vector of the light splitting surface is perpendicular to a central axis of the light uniformizing element. The illumination light beam is incident to the light incident surface of the light uniformizing element at an oblique angle, and the illumination light beam is split multiple times by the light splitting surface, so that the light uniformizing element outputs a uniformized illumination light beam at the light exit surface. The light valve is disposed on a transmission path of the uniformized illumination light beam, and the light valve is configured to convert the uniformized illumination light beam into an image light beam. The projection lens is disposed on a transmission path of the image light beam, and the projection lens is configured to project the image light beam out of the projection apparatus.

An embodiment of the invention provides a light uniformizing element having a light incident surface and a light exit surface opposite to the light incident surface. The light uniformizing element includes at least one light splitting surface. The light splitting surface is located inside the light uniformizing element. A normal vector of the light splitting surface is perpendicular to a central axis of the light uniformizing element. An illumination light beam is incident to the light incident surface of the light uniformizing element at an oblique angle, and the illumination light beam is split multiple times by the light splitting surface, so that the light uniformizing element outputs a uniformized illumination light beam at the light exit surface.

Based on the above description, in the illumination system and the projection apparatus of an embodiment of the invention, since the illumination system and the projection apparatus use a light uniformizing element with a light splitting surface, a display effect of the illumination system and the projection apparatus is better.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
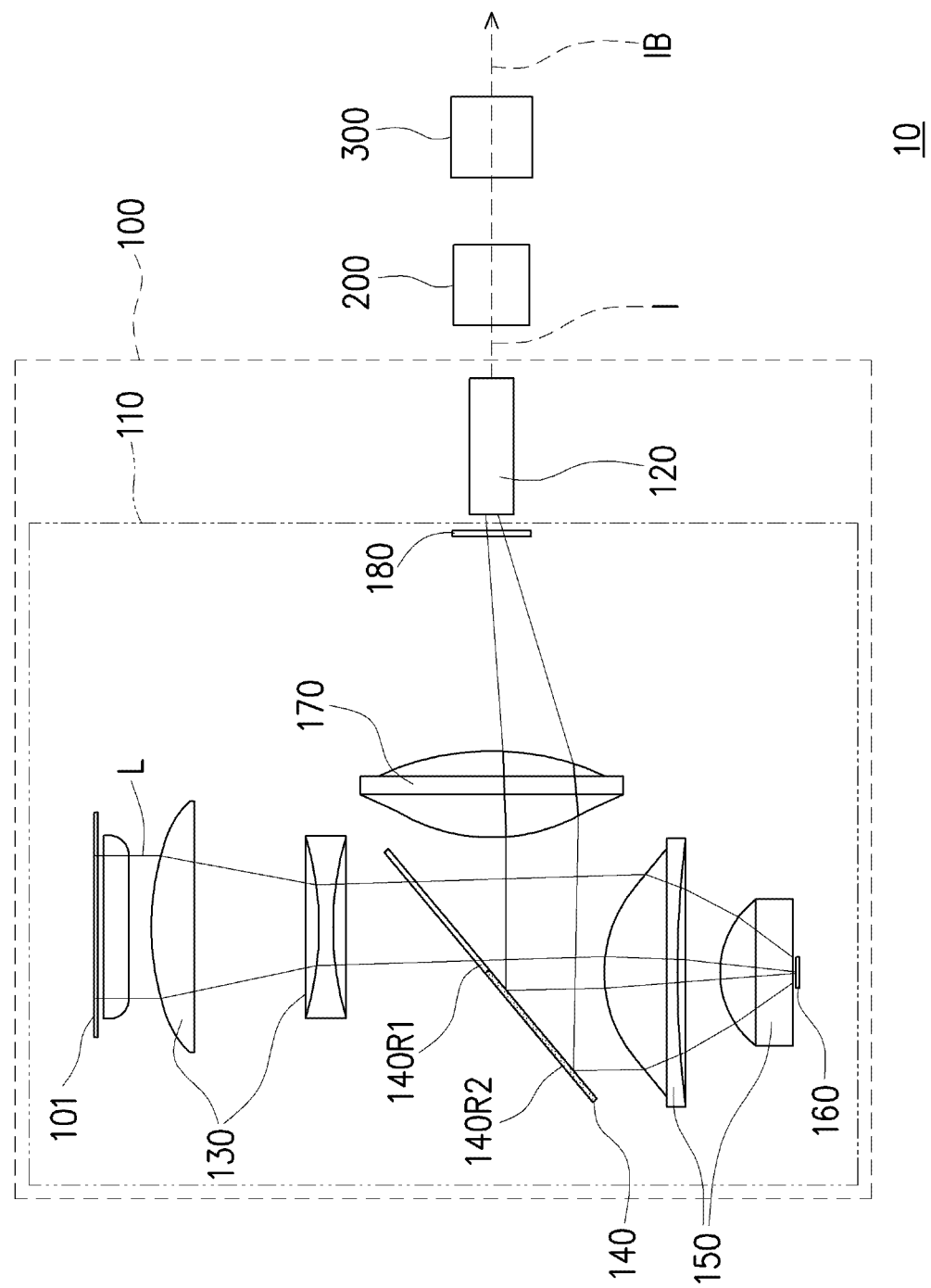
FIG. 1 is a schematic diagram of a projection apparatus according to an embodiment of the invention.

FIG. 1 is a schematic diagram of a projection apparatus according to an embodiment of the invention. Referring to FIG. 1, a projection apparatus 10 of the embodiment of the invention includes an illumination system 100, a light valve 200 and a projection lens 300. The illumination system 100 includes a light source module 110 and a light uniformizing element 120.

In the embodiment, the light source module 110 is configured to provide an illumination light beam I. The light source module 110 is, for example, a laser diode (LD), a light emitting diode (LED) or other suitable light sources or a combination with a light combining element, which is not limited by the invention. After the illumination light beam I passes through the light uniformizing element 120, a uniformized illumination light beam I is formed. In addition, the illumination light beam I includes, for example, blue light, red light, green light or other color light.

For example, the illumination system 100 may also selectively include a light emitting element 101, a light splitting element 140, a wavelength conversion element 160, and a filter element 180. The light splitting element 140 is disposed between the light emitting element 101 and the wavelength conversion element 160, and the filter element 180 is disposed between the light splitting element 140 and the light uniformizing element 120. The light emitting element 101 is configured to emit an excitation light beam L. The light splitting element 140 has a light splitting region 140R1 and a reflective region 140R2, wherein the light splitting region 140R1 allows light with a same wavelength as that of the excitation light beam L to pass through and reflects light of other wavelengths. The excitation light beam L emitted by the light emitting element 101 penetrates through the light splitting region 140R1 of the light splitting element 140 and is then obliquely incident to the wavelength conversion element 160.

In the embodiment, the wavelength conversion element 160 may be a phosphor color wheel and has a reflective region and a wavelength conversion region, wherein the wavelength conversion region converts the excitation light beam L into a converted light beam. However, the invention is not limited thereto, and in other embodiments, the wavelength conversion element may be replaced by a mirror. The filter element 180 may be a filter color wheel and has a first filter region and a second filter region. The excitation light beam L is, for example, blue light, the converted light beam may be red light, green light, yellow light or other light with a wavelength different from that of the excitation light beam L. At a first timing, the reflective region of the wavelength conversion element 160 and the first filter region of the filter element 180 are on the transmission path of the excitation light beam L. After the wavelength conversion element 160 reflects the excitation light beam L to the reflective region 140R2 of the light splitting element 140, the excitation light beam L penetrates through the first filter region of the filter element 180 to form the illumination light beam I, and the illumination light beam I is obliquely incident to the light uniformizing element 120.

At a second timing (not shown), the wavelength conversion region of the wavelength conversion element 160 is on the transmission path of the excitation light beam L and the second filter region of the filter element 180 is on a transmission path of the converted light beam. After the excitation light beam L is converted into the converted light beam by the wavelength conversion element 160, the converted light beam is reflected by the light splitting region 140R1 and the reflective region 140R2 of the light splitting element 140, and penetrates through the second filter region of the filter element 180 to form the illumination light beam I in sequence, and the illumination light beam I is incident to the light uniformizing element 120 in a normal direction. Therefore, the illumination light beam I provided by the light source module 110 (or the uniformized illumination beam I provided by the illumination system 100) includes the aforementioned excitation light beam L and the converted light beam (provided at different timings).

In the embodiment, the illumination system 100 further includes lens groups 130, 150, 170. The lens group 130 is disposed between the light emitting element 101 and the light splitting element 140, wherein the excitation light beam L emitted by the light emitting element 101 is contracted and collimated by the lens group 130 to penetrate through the light splitting region 140R1 of the light splitting element 140 and is further incident to the lens group 150. The lens group 150 is disposed between the light splitting element 140 and the wavelength conversion element 160, wherein the excitation light beam L penetrating through the light splitting element 140 is contracted by the lens group 150 and incident to the wavelength conversion element 160, and the excitation light beam L coming from the wavelength conversion element 160 is collimated by the lens group 150 and incident to the reflective region 140R2 of the light splitting element 140, or the converted light beam is collimated by the lens group 150 and incident to the light splitting region 140R1 and the reflective region 140R2 of the light splitting element 140. The lens group 170 is disposed between the light splitting element 140 and the light uniformizing element 120, wherein the excitation light beam L (or the converted light beam) is contracted by the lens group 170 and incident to the filter element 180 and the light uniformizing element 120.

Besides, in the embodiment, the light valve 200 is, for example, a spatial light modulator such as a digital micro-mirror device (DMD), a liquid-crystal-on-silicon panel (LCOS panel), or a liquid crystal display (LCD) panel. The projection lens 300 is, for example, a combination of one or more optical lenses with refracting powers. The optical lens, for example, includes a non-planar lens such as a biconcave lens, a biconvex lens, a concavo-convex lens, a convexo-concave lens, a plano-convex lens, a plano-concave lens, etc., or various combinations thereof. The pattern and type of the light valve 200 and the projection lens 300 are not limited by the invention.

Figure 2A:
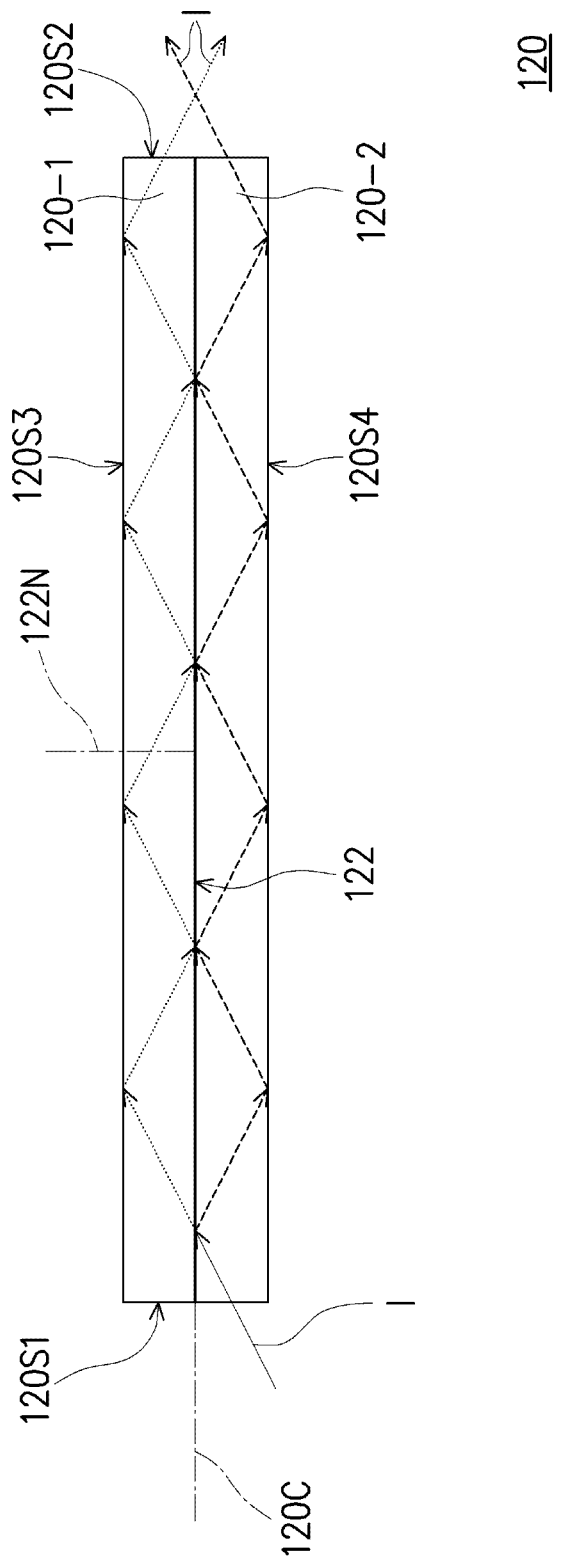
FIG. 2A is a schematic cross-sectional view of a light uniformizing element according to a first embodiment of the invention.
Figure 2B:
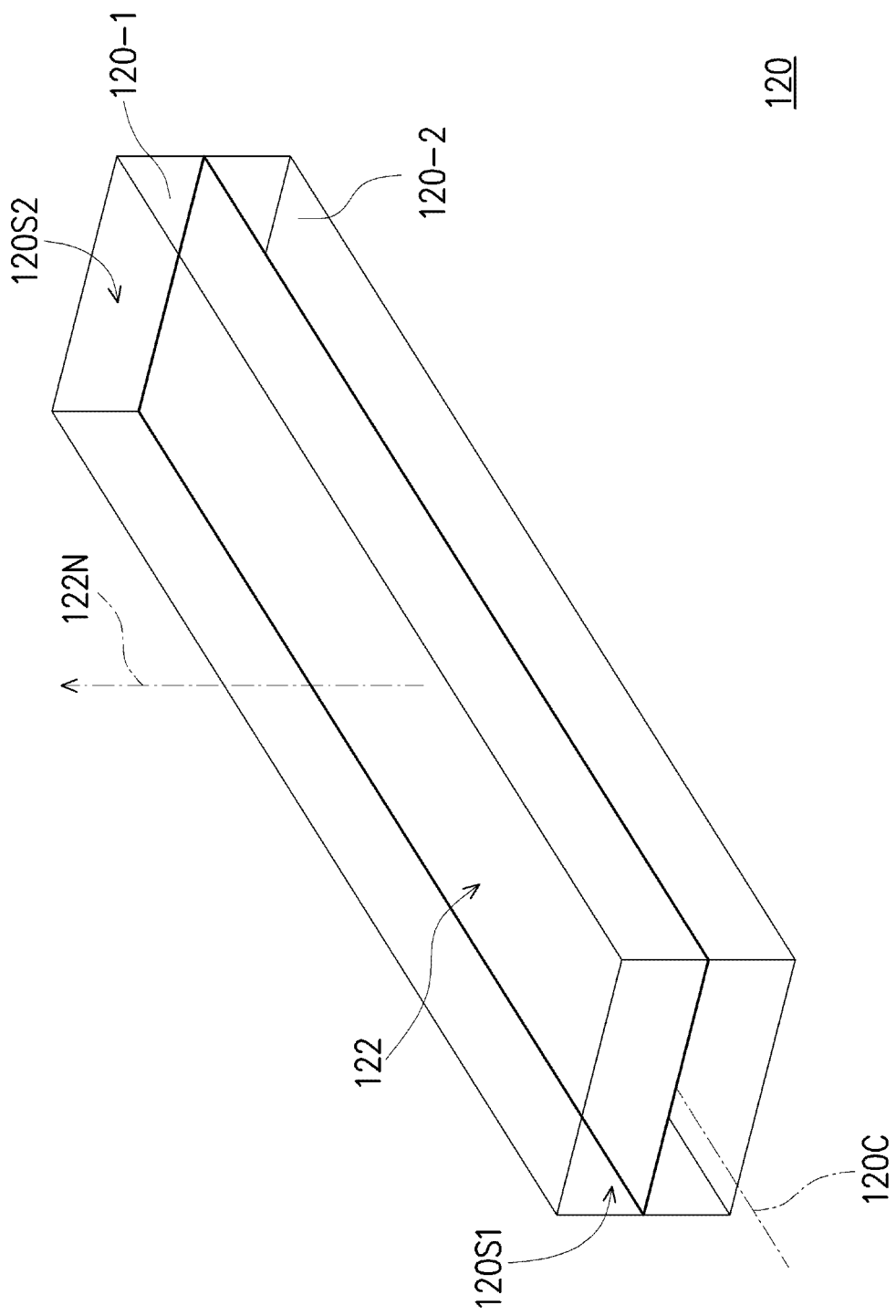
FIG. 2B is a schematic three-dimensional view of FIG. 2A.

FIG. 2A is a schematic cross-sectional view of a light uniformizing element according to a first embodiment of the invention. FIG. 2B is a schematic three-dimensional view of FIG. 2A. Referring to FIG. 2A and FIG. 2B at the same time, the light uniformizing element 120 is, for example, an integration rod, or other optical elements with a light uniformizing effect. The light uniformizing element 120 has a light incident surface 120S1, a light exit surface 120S2 opposite to the light incident surface 120S1, and side surfaces 120S3 and 120S4 respectively connected between the light incident surface 120S1 and the light exit surface 120S2, and the light uniformizing element 120 includes at least one light splitting surface 122. The light splitting surface 122 is located inside the light uniformizing element 120, for example, located between the light incident surface 120S1 and the light exit surface 120S2, and between the side surface 120S3 and the side surface 120S4. A normal vector 122N of the light splitting surface 122 is perpendicular to a central axis 120C (for example, an optical axis) of the light uniformizing element 120, for example, the light splitting surface 122 is perpendicular to the light incident surface 120S1, and the central axis 120C of the light uniformizing element 120, for example, passes through the light splitting surface 122, but the invention is not limited thereto. In other embodiments, the central axis 120C of the light uniformizing element 120 may not pass through the light splitting surface 122 (for example, for special purposes). The illumination light beam I is incident on the light incident surface 120S1 of the light uniformizing element 120 at an oblique angle, wherein the illumination light beam I may be non-parallel (or non-perpendicular) to the central axis 120C or non-perpendicular to the light incident surface 120S1 of the light uniformizing element 120.

In the embodiment, the illumination light beam I is split multiple times by the light splitting surface 122, so that the light uniformizing element 120 outputs a uniformized illumination light beam I at the light exit surface 120S2. As shown in FIG. 2A, after the illumination light beam I is incident to the light uniformizing element 120, a part of the illumination light beam I penetrates through the light splitting surface 122, and the other part is reflected by the light splitting surface 122. The part of the illumination light beam I that penetrates through the light splitting surface 122 and the part of the illumination light beam I that is reflected by the light splitting surface 122 are reflected to the light splitting surface 122 by the side surfaces 120S3 and 120S4 of the light uniformizing element 120. Deduced by analogy, the illumination light beam I is split multiple times by the light splitting surface 122 and reflected by the side surfaces 120S3 and 120S4, so that an intensity of the illumination light beam I emitted from the light exit surface 120S2 of the light uniformizing element 120 is similar at all angles, and the uniformized illumination light beam I is formed.

In the embodiment, the light splitting surface 122 is perpendicular to the light incident surface 120S1 and/or the light exit surface 120S2.

In the embodiment, as shown in FIG. 2A and FIG. 2B, the light uniformizing element 120 includes a plurality of solid sub-elements 120-1, 120-2. The light splitting surface 122 is, for example, a light splitting element, an optical film, or a light splitting layer (such as a coating film), and each light splitting surface 122 is respectively disposed between two adjacent ones of the plurality of solid sub-elements, for example, the light splitting surface 122 is disposed on a surface of the solid sub-element 120-1 adjacent to the solid sub-element 120-2, or disposed on a surface of the solid sub-element 120-2 adjacent to the solid sub-element 120-1. Namely, the light splitting surface 122 is, for example, provided on the solid sub-element 120-1 or the solid sub-element 120-2 through a coating process. The solid sub-elements 120-1 and 120-2 are bonded to form the light uniformizing element 120. Therefore, the arrangement of the light splitting surface 122 on the solid sub-elements 120-1 and 120-2 simplifies a manufacturing process of the light uniformizing element 120.

In another embodiment, the light uniformizing element 120 may be hollow, and the light splitting surface 122 is a light splitter, such as a half mirror. Therefore, the hollow light uniformizing element 120 makes the manufacturing cost of the illumination system 100, the projection apparatus 10, or the light uniformizing element 120 lower.

In the embodiment, the light splitting surface 122 is, for example, transflective to visible light, or a transmittance is within a range of 30% to 70%, and a reflectivity is within a range of 30% to 70%, which are not particularly limited by the invention. In other embodiments, the light splitting surface 122 may have different reflectivity for different colors of light. The ranges of transmittance and reflectivity further make the intensity of the illumination light beam I emitted from the light exit surface 120S2 of the light uniformizing element 120 more uniform.

In the embodiment, the light splitting surface 122 extends in a direction from the light incident surface 120S1 to the light exit surface 120S2.

Referring to FIG. 1, in the embodiment, the light valve 200 is disposed on a transmission path of the uniformized illumination light beam I, and the light valve 200 is configured to convert the uniformized illumination light beam I into an image light beam IB. The projection lens 300 is disposed on a transmission path of the image light beam IB, and the projection lens 300 is configured to project the image light beam IB out of the projection apparatus 10.

Figure 2C:
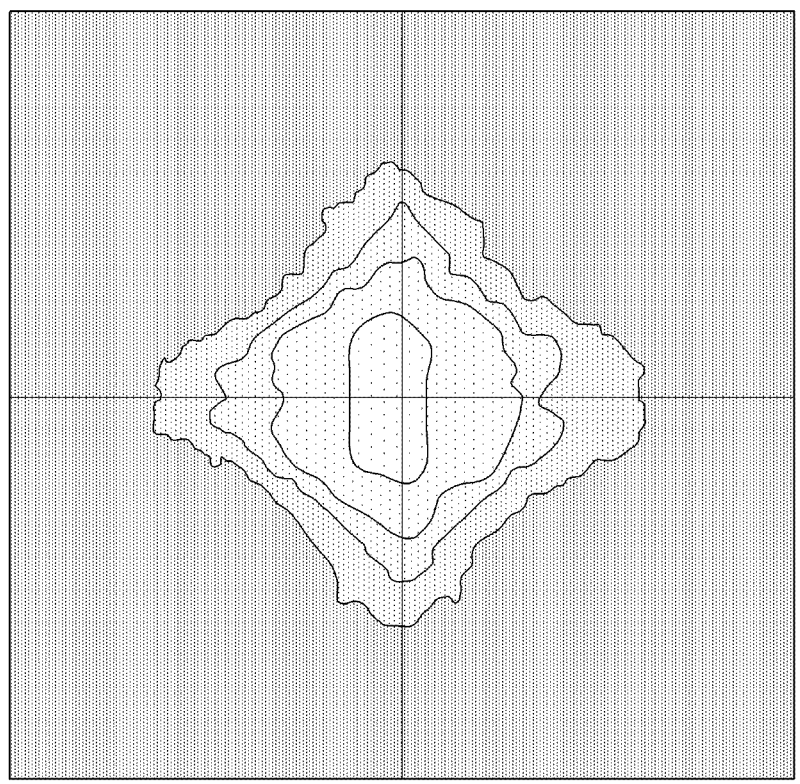
FIG. 2C is a light spot angle distribution diagram of an illumination light beam emitted from a light exiting surface of the light uniformizing element of FIG. 2A.

FIG. 2C is a light spot angle distribution diagram of an illumination light beam emitted from the light exiting surface of the light uniformizing element of FIG. 2A. Referring to FIG. 2C, in the illumination system 100 and the projection apparatus 10 of an embodiment of the invention, since the illumination system 100 and the projection apparatus 10 use the light uniformizing element 120 with the light splitting surface 122, the illuminating light beam I is split multiple times by the light splitting surface 122, so that the light uniformizing element 120 outputs a uniformized illumination light beam I at the light exit surface 120S2, even if the illumination light beam I is incident to the light uniformizing element 120 at an oblique angle, a light angle distribution of the illumination light beam I emitted from the light uniformizing element 120 is still uniform, so that a display effect of the illumination system 100 and the projection apparatus 10 is better.

Figure 3A:
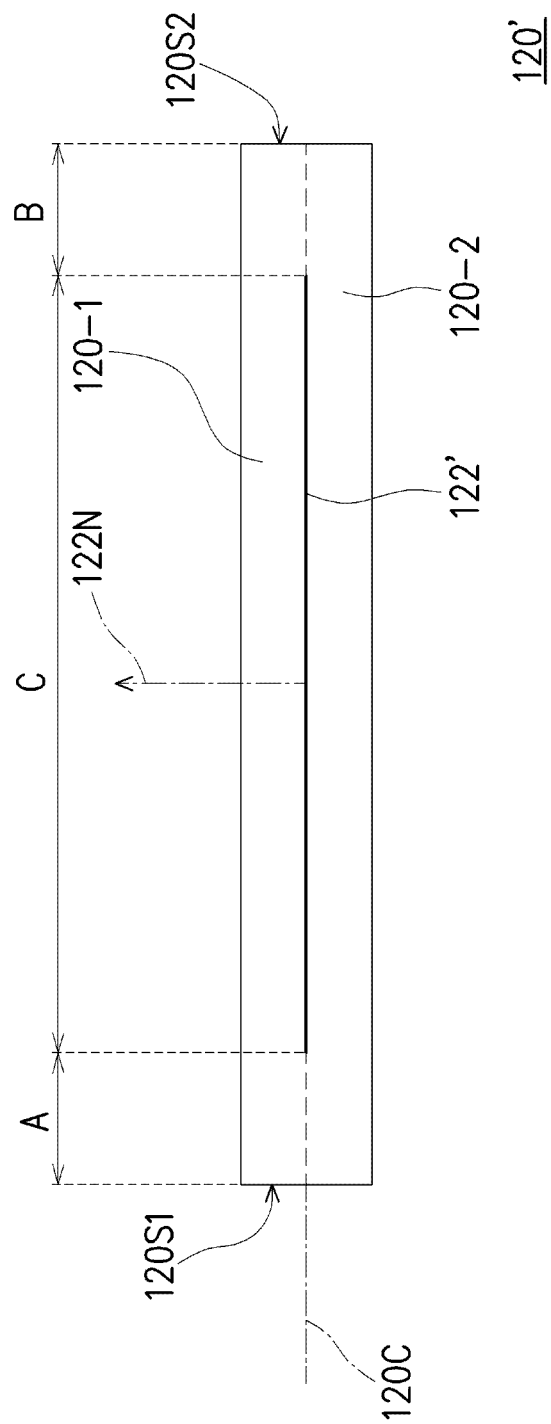
FIG. 3A is a schematic cross-sectional view of a light uniformizing element according to a second embodiment of the invention.

FIG. 3A is a schematic cross-sectional view of a light uniformizing element according to a second embodiment of the invention. In FIG. 3A, A is the closest distance between a light splitting surface 122' and the light incident surface 120S1 (in a direction along the central axis 120C), B is the closest distance between the light splitting surface 122' and the light exit surface 120S2 (in the direction along the central axis 120C), and C is a length of the light splitting surface 122' in the direction along the central axis 120C. Referring to FIG. 3A, a light uniformizing element 120' of FIG. 3A is similar to the light uniformizing element 120 of FIG. 2A, and a difference there between is only that the distances A and B of the light uniformizing element 120' are greater than 0 (A+B>0), i.e., the light splitting surface 122' does not completely cover the surface of the solid sub-element 120-1 adjacent to the solid sub-element 120-2. In the embodiment, the light uniformizing element 120' satisfies a following expression (1): $B/(A+B+C) \geq 0.1$.

In the embodiment, the light uniformizing element 120' also satisfies a following expression (2): $C/(A+B+C) \geq 0.4$.

Figure 3B:
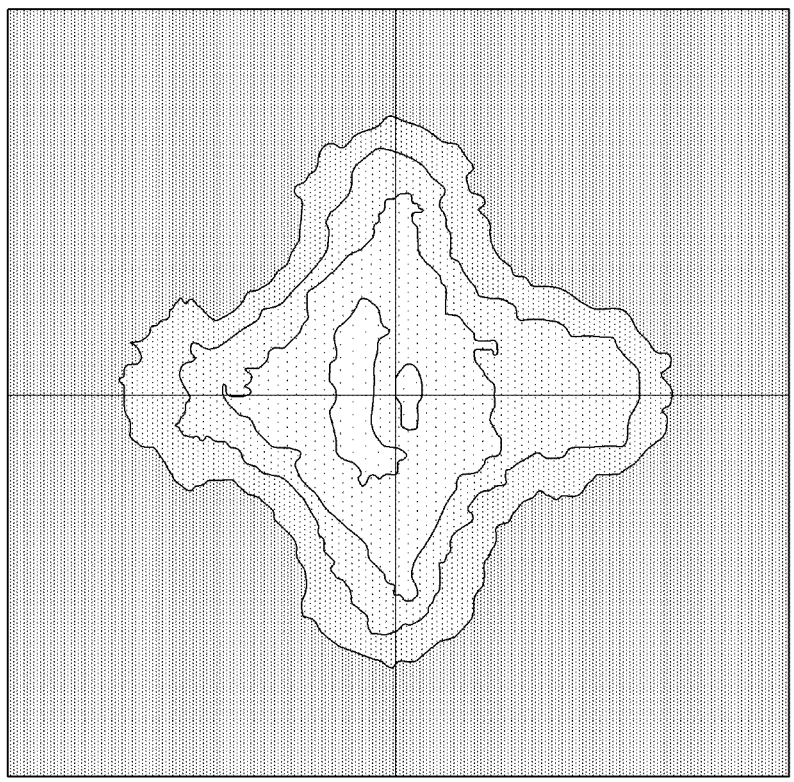
FIG. 3B is a light spot angle distribution diagram of an illumination light beam emitted from a light exiting surface of the light uniformizing element of FIG. 3A.

FIG. 3B is a light spot angle distribution diagram of an illumination light beam emitted from the light exiting surface of the light uniformizing element of FIG. 3A, wherein the distance A=0. Since the light uniformizing element 120' satisfies the aforementioned expression (1) and expression (2), a light angle distribution of the illumination light beam I emitted from the light uniformizing element 120' is relatively uniform.

Figure 4A:
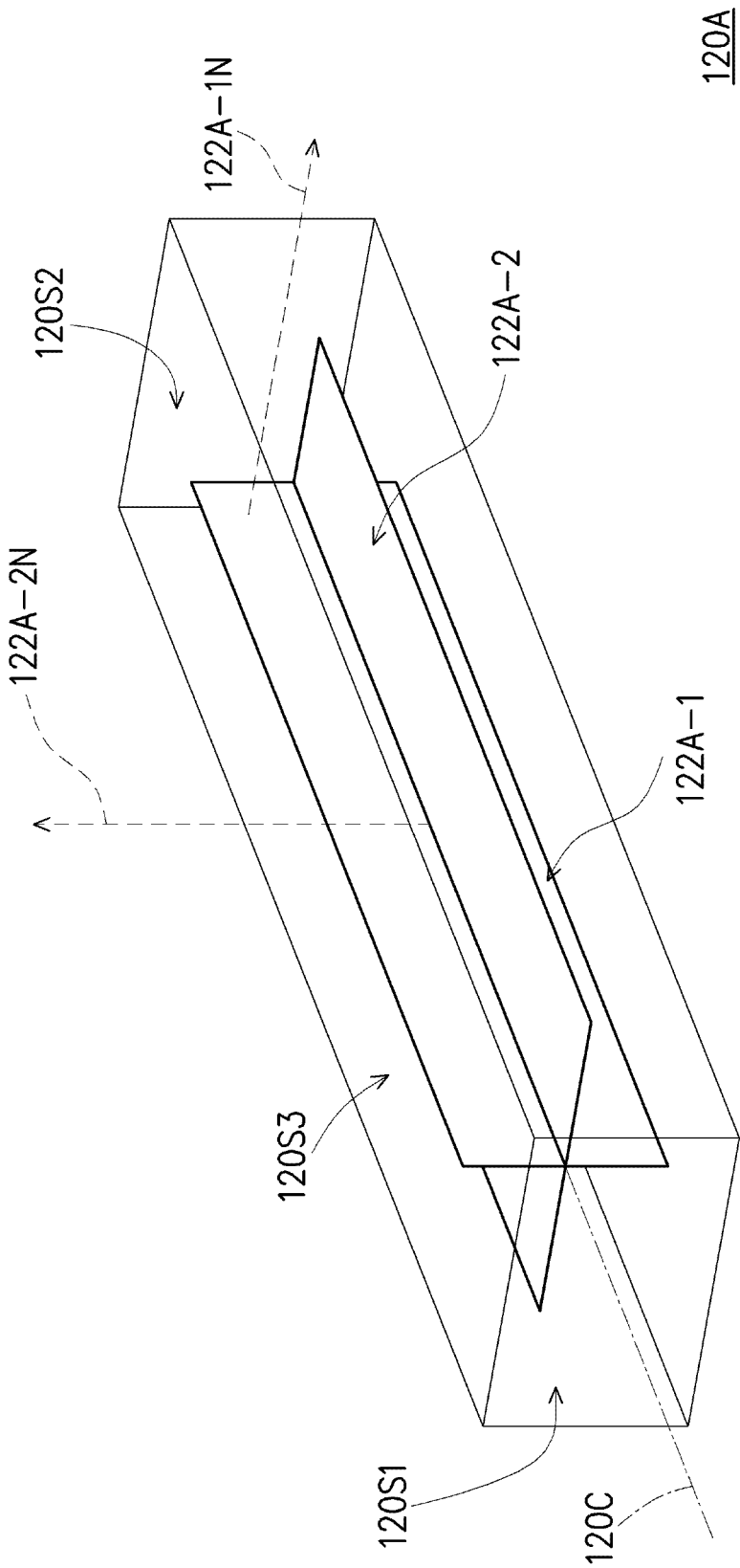
FIG. 4A is a schematic three-dimensional view of a light uniformizing element according to a third embodiment of the invention.
Figure 4B:
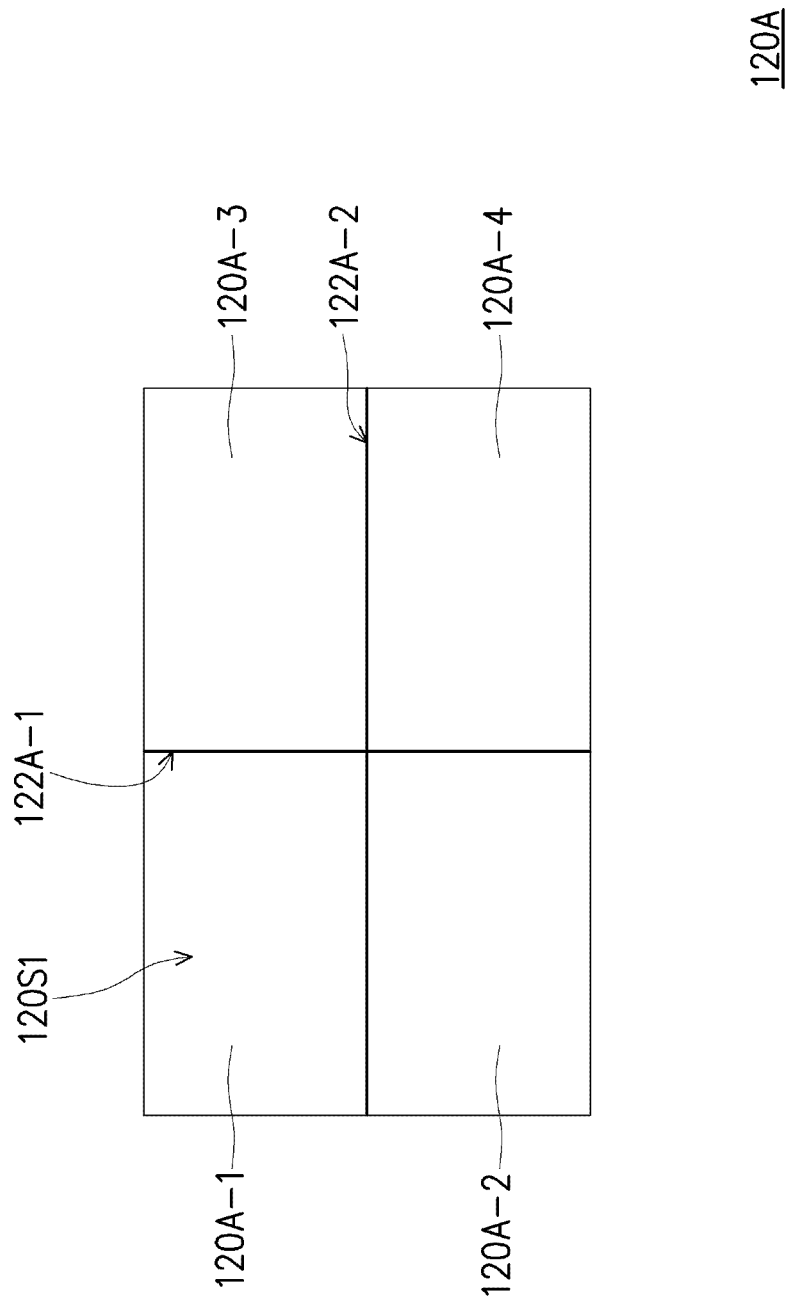
FIG. 4B is a schematic cross-sectional view of FIG. 4A.

FIG. 4A is a schematic three-dimensional view of a light uniformizing element according to a third embodiment of the invention. FIG. 4B is a schematic cross-sectional view of FIG. 4A. Referring to FIG. 4A and FIG. 4B, a light uniformizing element 120A of FIG. 4A is similar to the light uniformizing element 120' of FIG. 3A, and a main difference there between is that: the light uniformizing element 120A includes two light splitting surfaces 122A-1, 122A-2, wherein the light splitting surfaces 122A-1, 122A-2 are not parallel to each other, for example, the light splitting surfaces 122A-1, 122A-2 are perpendicular to each other, and normal vectors 122A-1N and 122A-2N of the light splitting surfaces 122A-1, 122A-2 are not parallel to each other. In the embodiment, the light splitting surfaces 122A-1 and 122A-2 have, for example, the same reflectivity and transmittance, but the invention is not limited thereto, and in other embodiments, the light splitting surfaces 122A-1 and 122A-2 may have different reflectivity, or have different reflectivity for different colors of light. In detail, the light uniformizing element 120A may include solid sub-elements 120A-1, 120A-2, 120A-3, and 120A-4. The light splitting surfaces 122A-1, 122A-2 are respectively disposed between every adjacent two of the solid sub-elements 120A-1, 120A-2, 120A-3, 120A-4, and may be selectively disposed on one of every two adjacent surfaces. The normal vectors 122A-1N, 122A-2N of the light splitting surfaces 122A-1 and 122A-2 are perpendicular to each other, and the normal vectors 122A-1N of the light splitting surface 122A-1 is, for example, parallel to the side surface 120S3. Namely, the light splitting surfaces 122A-1 and 122A-2 are intersected to form a cross shape, and the central axis 120C of the light uniformizing element 120 respectively passes through the light splitting surfaces 122A-1 and 122A-2. The effect achieved by the light uniformizing element 120A of FIG. 4A is similar to the effect achieved by the light uniformizing element 120 of FIG. 2A, and detail thereof is not repeated.

Figure 5A:
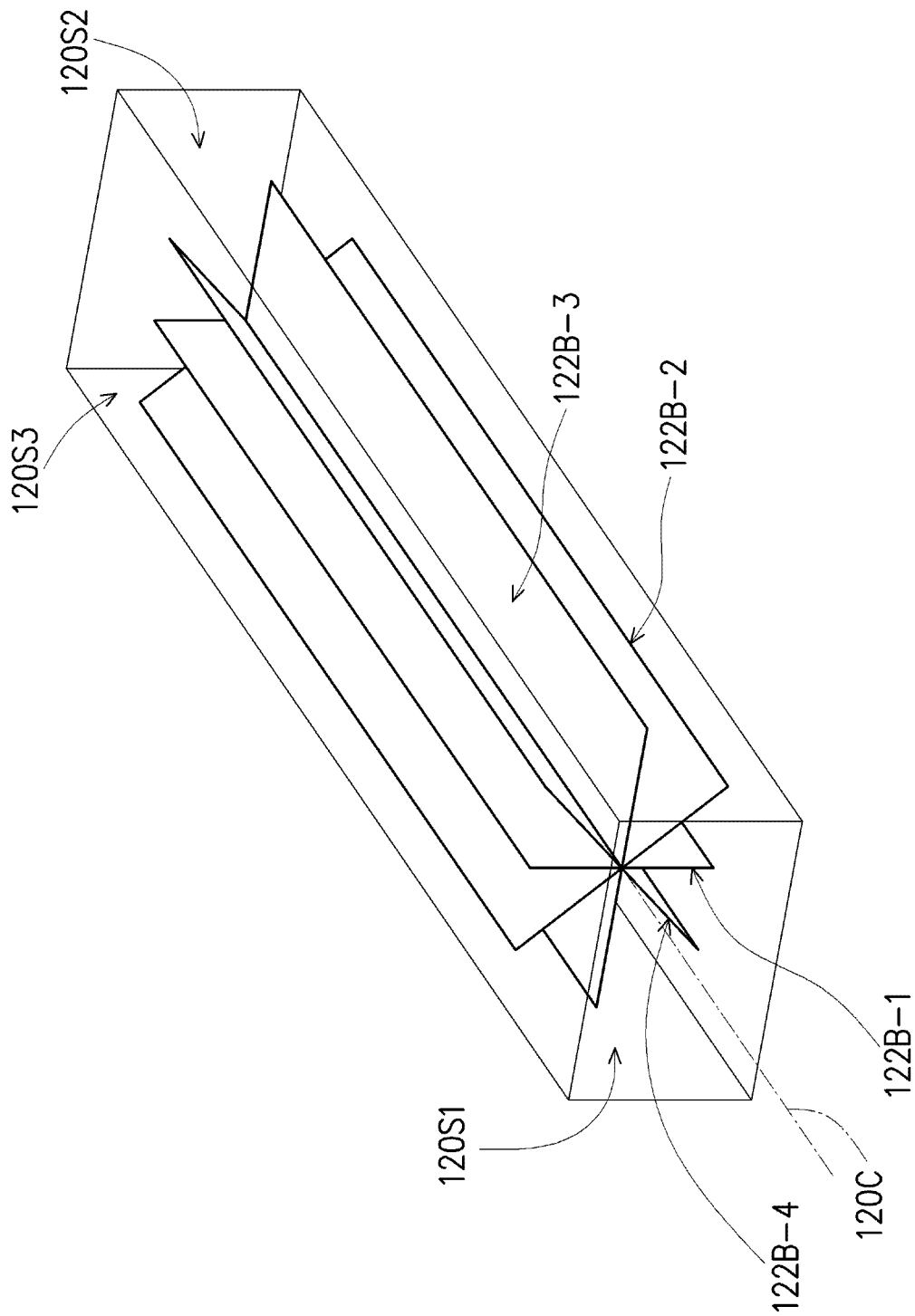
FIG. 5A is a schematic three-dimensional view of a light uniformizing element according to a fourth embodiment of the invention.
Figure 5B:
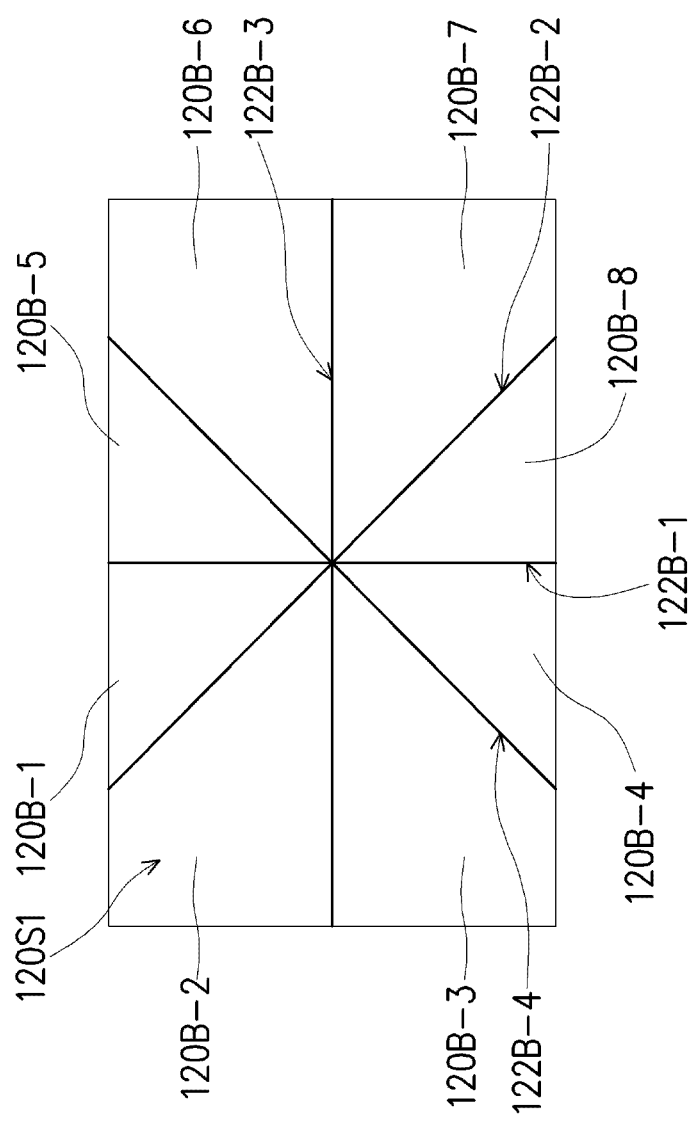
FIG. 5B is a schematic cross-sectional view of FIG. 5A.

FIG. 5A is a schematic three-dimensional view of a light uniformizing element according to a fourth embodiment of the invention. FIG. 5B is a schematic cross-sectional view of FIG. 5A. Referring to FIG. 5A and FIG. 5B, a light uniformizing element 120B of FIG. 5A is similar to the light uniformizing element 120A of FIG. 4A, and a main difference there between is that: the light uniformizing element 120B includes four light splitting surfaces 122B-1, 122B-2, 122B-3, and 122B-4. In detail, the light uniformizing element 120B includes solid sub-elements 120B-1, 120B-2, 120B-3, 120B-4, 120B-5, 120B-6, 120B-7, 120B-8, and a cross-sectional shape of each solid sub-element 120B-1 to 120B-8 on the light incident surface 120S1 is, for example, a triangle or a trapezoid. The light splitting surfaces 122B-1, 122B-2, 122B-3, 122B-4 are respectively disposed between every adjacent two of the solid sub-elements 120B-1, 120B-2, 120B-3, 120B-4, 120B-5, 120B-6, 120B-7 and 120B-8. The light splitting surfaces 122B-1, 122B-2, 122B-3, and 122B-4 are intersected to form a union jack shape, and the central axis 120C of the light uniformizing element 120 passes through the light splitting surfaces 122B-1 to 122B-4, respectively. The effect achieved by the light uniformizing element 120B of FIG. 5A is similar to the effect achieved by the light uniformizing element 120 of FIG. 2A, and detail thereof is not repeated.

Figure 6A:
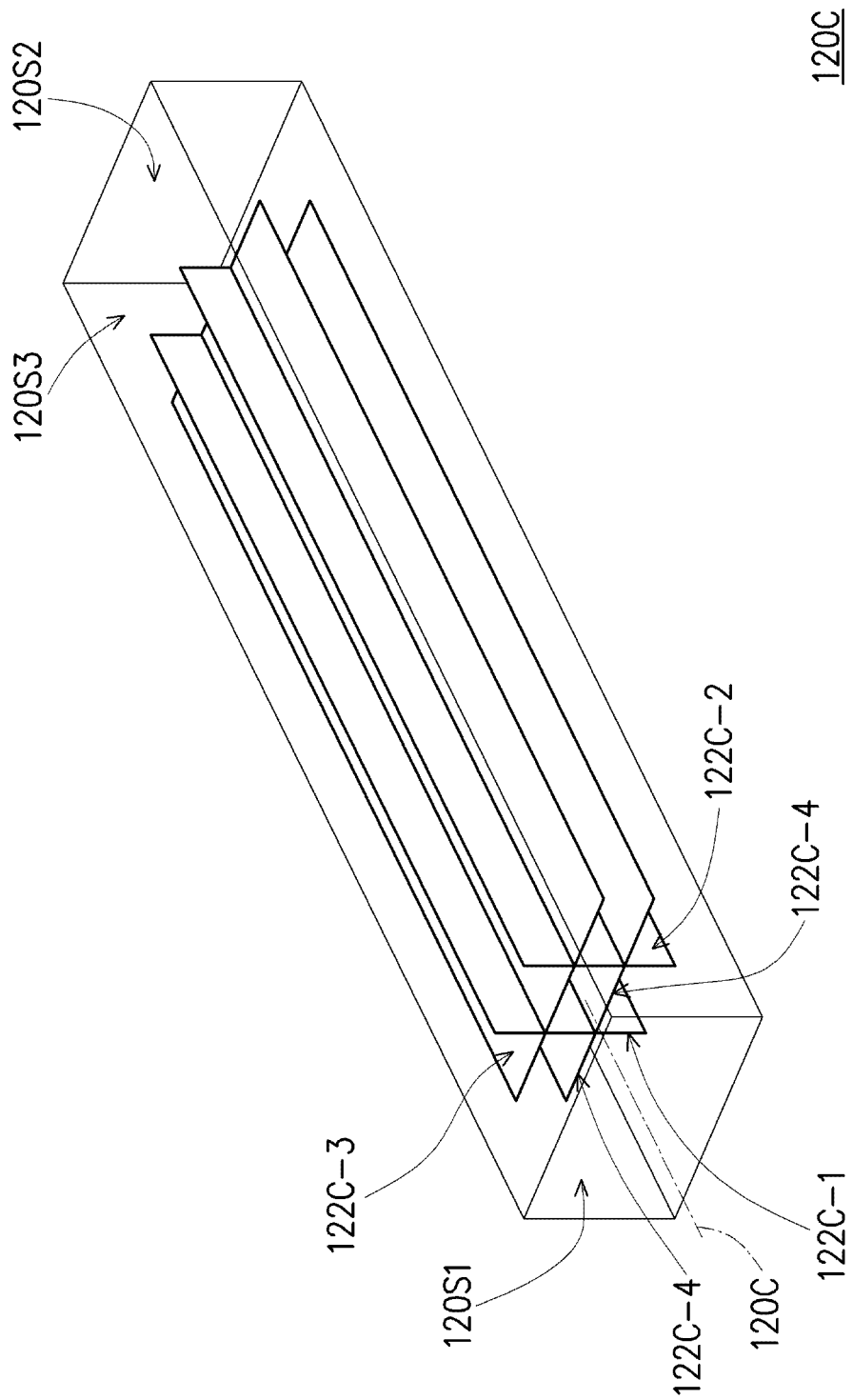
FIG. 6A is a schematic three-dimensional view of a light uniformizing element according to a fifth embodiment of the invention.
Figure 6B:
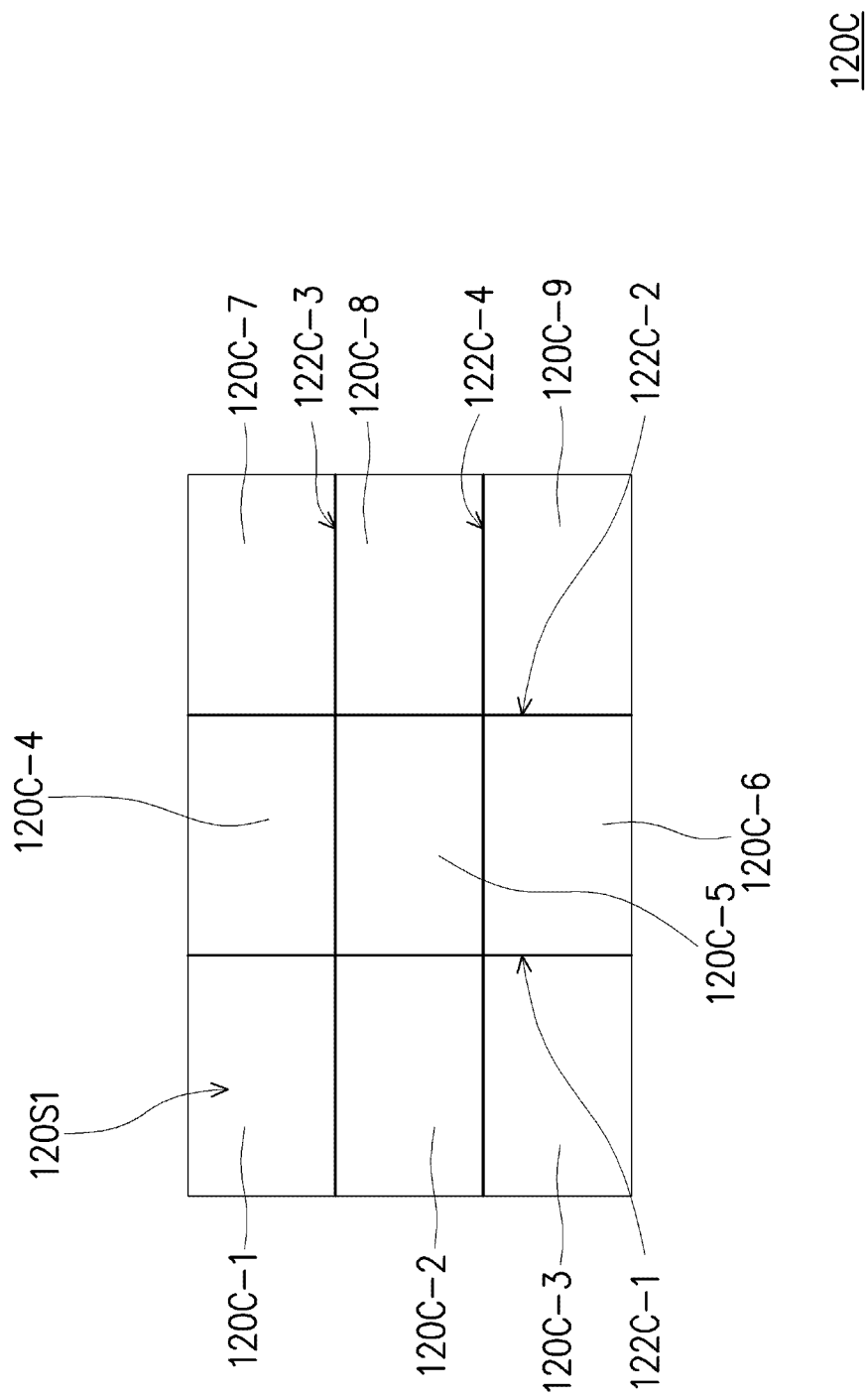
FIG. 6B is a schematic cross-sectional view of FIG. 6A.

FIG. 6A is a schematic three-dimensional view of a light uniformizing element according to a fifth embodiment of the invention. FIG. 6B is a schematic cross-sectional view of FIG. 6A. Referring to FIG. 6A and FIG. 6B, a light uniformizing element 120C of FIG. 6A is similar to the light uniformizing element 120A of FIG. 4A, and a main difference there between is that: the light uniformizing element 120C includes four light splitting surfaces 122C-1, 122C-2, 122C-3, and 122C-4. In detail, the light uniformizing element 120C includes solid sub-elements 120C-1, 120C-2, 120C-3, 120C-4, 120C-5, 120C-6, 120C-7, 120C-8, 120C-9, and a cross-sectional shape and an area of each of the solid sub-elements 120C-1 to 120C-9 on the light incident surface 120S1 are, for example, the same, but the invention is not limited thereto. The light splitting surfaces 122C-1, 122C-2, 122C-3, 122C-4 are respectively disposed between every adjacent two of the solid sub-elements 120C-1, 120C-2, 120C-3, 120C-4, 120C-5, 120C-6, 120C-7, 120C-8 and 120C-9, and the light splitting surfaces 122C-1 to 122C-4 are, for example, parallel or perpendicular to the side surface 120S3. The light splitting surfaces 122C-1, 122C-2, 122C-3, 122C-4 form a pound sign. The effect achieved by the light uniformizing element 120C of FIG. 6A is similar to the effect achieved by the light uniformizing element 120 of FIG. 2A, and detail thereof is not repeated.

Figure 7A:
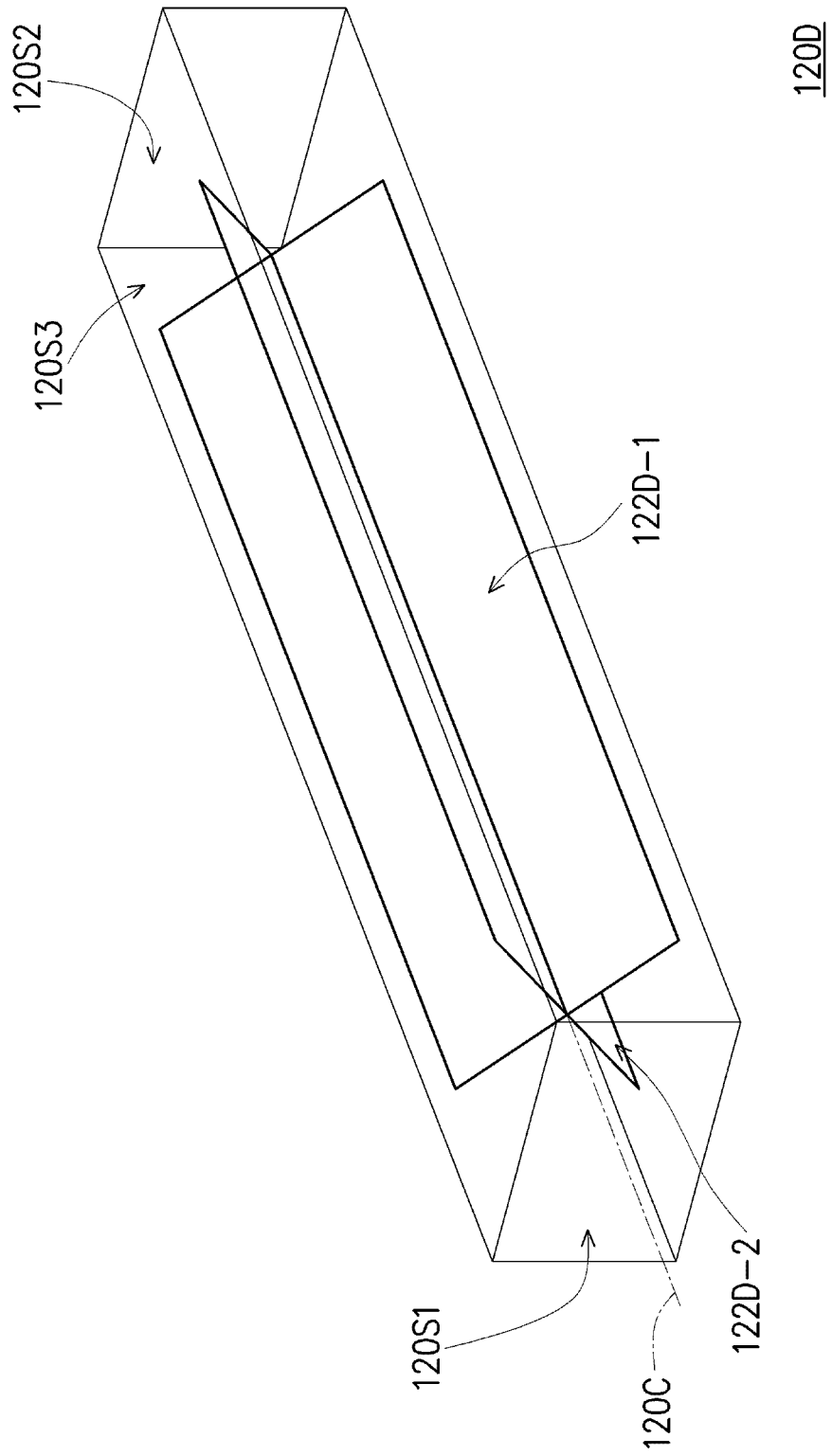
FIG. 7A is a schematic three-dimensional view of a light uniformizing element according to a sixth embodiment of the invention.
Figure 7B:
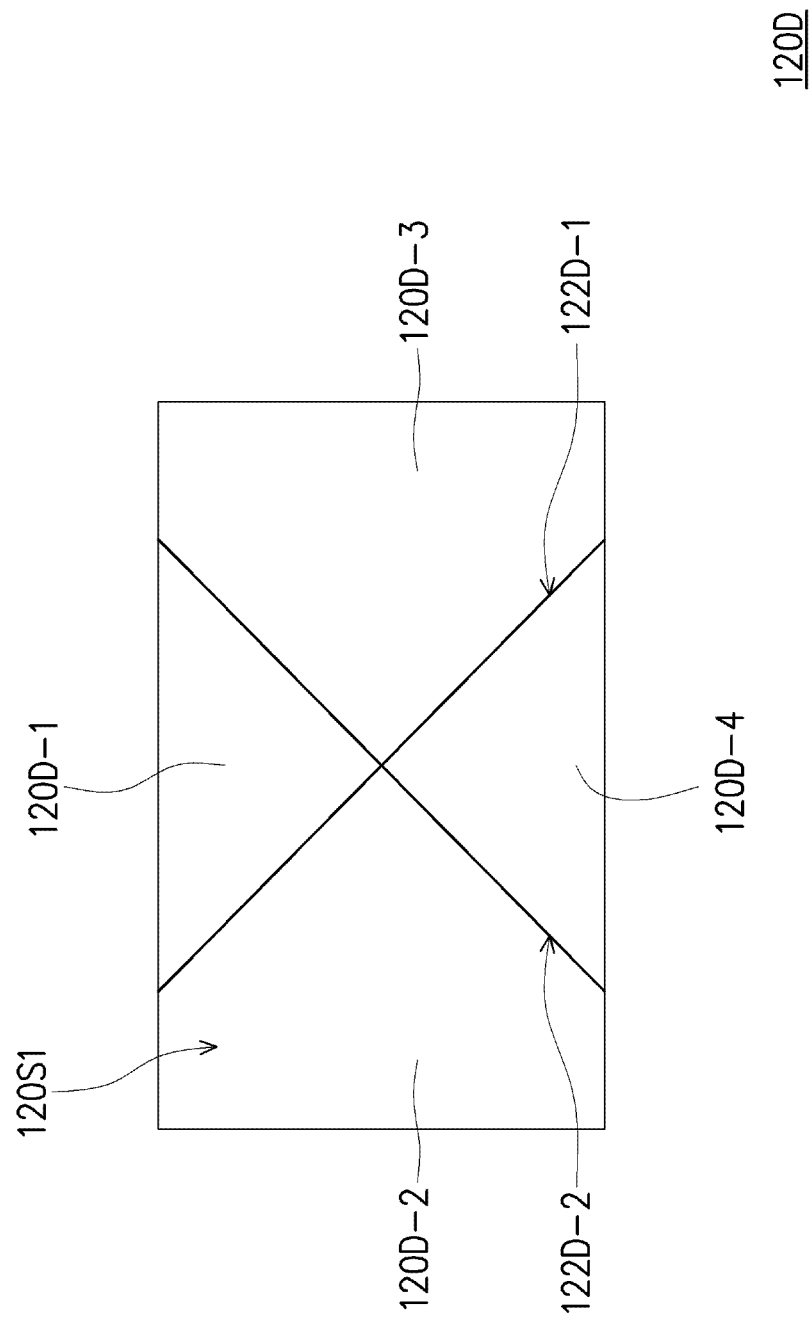
FIG. 7B is a schematic cross-sectional view of FIG. 7A.

FIG. 7A is a schematic three-dimensional view of a light uniformizing element according to a sixth embodiment of the invention. FIG. 7B is a schematic cross-sectional view of FIG. 7A. Referring to FIG. 7A and FIG. 7B, a light uniformizing element 120D of FIG. 7A is similar to the light uniformizing element 120A of FIG. 4A, and a main difference there between is that: arrangement directions of the light splitting surfaces 122D-1 and 122D-2 of the light uniformizing element 120D are different. In detail, the light splitting surfaces 122D-1 and 122D-2 are respectively disposed between every adjacent two of the solid sub-elements 120D-1, 120D-2, 120D-3, and 120D-4. The light splitting surfaces 122D-1 and 122D-2 are, for example, not parallel and not perpendicular to the side surface 120S3. The light splitting surfaces 122D-1 and 122D-2 are intersected to form a cross shape, and the central axis 120C of the light uniformizing element 120D passes through the light splitting surfaces 122D-1 and 122D-2, respectively. The effect achieved by the light uniformizing element 120D of FIG. 7A is similar to the effect achieved by the light uniformizing element 120 of FIG. 2A, and detail thereof is not repeated.

In summary, in the illumination system and the projection apparatus of an embodiment of the invention, since the illumination system and the projection apparatus use a light uniformizing element with a light splitting surface, the light uniformizing element outputs a uniformized illumination light beam at the light exit surface, and a display effect of the illumination system and the projection apparatus is better.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An illumination system, comprising a light source module and a light uniformizing element, wherein
    the light source module is configured to provide an illumination light beam, the light uniformizing element has a light incident surface and a light exit surface opposite to the light incident surface, and the light uniformizing element comprises:
        at least one light splitting surface, located inside the light uniformizing element, wherein a normal vector of the at least one light splitting surface is perpendicular to a central axis of the light uniformizing element, the illumination light beam is incident to the light incident surface of the light uniformizing element at an oblique angle, and the illumination light beam is split a plurality of times by the at least one light splitting surface, so that the light uniformizing element outputs a uniformized illumination light beam at the light exit surface.

2. The illumination system according to claim 1, wherein the light uniformizing element is hollow, and the at least one light splitting surface is a light splitter.

3. The illumination system according to claim 1, wherein the light uniformizing element comprises a plurality of solid sub-elements, the at least one light splitting surface is an optical film, and each light splitting surface is respectively disposed between adjacent two of the solid sub-elements.

4. The illumination system according to claim 1, wherein the at least one light splitting surface is perpendicular to the light incident surface or the light exit surface.

5. The illumination system according to claim 1, wherein the light uniformizing element satisfies a following expression: B/(A+B+C)≥0.1, where A is a distance between the at least one light splitting surface and the light incident surface, B is a distance between the at least one light splitting surface and the light exit surface, and C is a length of the at least one light splitting surface in a direction along the central axis.

6. The illumination system according to claim 1, wherein the light uniformizing element satisfies a following expression: C/(A+B+C)≥0.4, where A is a distance between the at least one light splitting surface and the light incident surface, B is a distance between the at least one light splitting surface and the light exit surface, and C is a length of the at least one light splitting surface in a direction along the central axis.

7. The illumination system according to claim 1, wherein the at least one light splitting surface comprises a plurality of light splitting surfaces, wherein normal vectors of any two of the light splitting surfaces are not parallel.

8. The illumination system according to claim 1, wherein the at least one light splitting surface comprises a plurality of light splitting surfaces, wherein at least two of the light splitting surfaces are perpendicular to each other.

9. The illumination system according to claim 1, wherein a transmittance of the at least one light splitting surface is within a range of 30% to 70%, and a reflectivity thereof is within the range of 30% to 70%.

10. The illumination system according to claim 1, wherein the at least one light splitting surface extends along a direction from the light incident surface to the light exit surface.

11. A projection apparatus, comprising an illumination system, a light valve, and a projection lens, wherein the illumination system comprises a light source module and a light uniformizing element, wherein
the light source module is configured to provide an illumination light beam, the light uniformizing element has a light incident surface and a light exit surface opposite to the light incident surface, and the light uniformizing element comprises:
at least one light splitting surface, located inside the light uniformizing element, wherein a normal vector of the at least one light splitting surface is perpendicular to a central axis of the light uniformizing element, the illumination light beam is incident to the light incident surface of the light uniformizing element at an oblique angle, and the illumination light beam is split a plurality of times by the at least one light splitting surface, so that the light uniformizing element outputs a uniformized illumination light beam at the light exit surface,
the light valve is disposed on a transmission path of the uniformized illumination light beam, and the light valve is configured to convert the uniformized illumination light beam into an image light beam, and
the projection lens is disposed on a transmission path of the image light beam, and the projection lens is configured to project the image light beam out of the projection apparatus.

12. The projection apparatus according to claim 11, wherein the light uniformizing element is hollow, and the at least one light splitting surface is a light splitter.

13. The projection apparatus according to claim 11, wherein the light uniformizing element comprises a plurality of solid sub-elements, the at least one light splitting surface is an optical film, and each light splitting surface is respectively disposed between adjacent two of the solid sub-elements.

14. The projection apparatus according to claim 11, wherein the at least one light splitting surface is perpendicular to the light incident surface or the light exit surface.

15. The projection apparatus according to claim 11, wherein the light uniformizing element satisfies a following expression: B/(A+B+C)≥0.1, where A is a distance between the at least one light splitting surface and the light incident surface, B is a distance between the at least one light splitting surface and the light exit surface, and C is a length of the at least one light splitting surface in a direction along the central axis.

16. The projection apparatus according to claim 11, wherein the light uniformizing element satisfies a following expression: C/(A+B+C)≥0.4, where A is a distance between the at least one light splitting surface and the light incident surface, B is a distance between the at least one light splitting surface and the light exit surface, and C is a length of the at least one light splitting surface in a direction along the central axis.

17. The projection apparatus according to claim 11, wherein the at least one light splitting surface comprises a plurality of light splitting surfaces, wherein normal vectors of any two of the light splitting surfaces are not parallel.

18. The projection apparatus according to claim 11, wherein the at least one light splitting surface comprises a plurality of light splitting surfaces, wherein at least two of the light splitting surfaces are perpendicular to each other.

19. The projection apparatus according to claim 11, wherein a transmittance of the at least one light splitting surface is within a range of 30% to 70%, and a reflectivity thereof is within the range of 30% to 70%.

20. The projection apparatus according to claim 11, wherein the at least one light splitting surface extends along a direction from the light incident surface to the light exit surface.

21. A light uniformizing element, having a light incident surface and a light exit surface opposite to the light incident surface, the light uniformizing element comprising:
at least one light splitting surface, located inside the light uniformizing element, wherein a normal vector of the at least one light splitting surface is perpendicular to a central axis of the light uniformizing element, an illumination light beam is incident to the light incident surface of the light uniformizing element at an oblique angle, and the illumination light beam is split a plurality of times by the at least one light splitting surface, so that the light uniformizing element outputs a uniformized illumination light beam at the light exit surface.

* * * * *